United States Patent
Jiang et al.

(10) Patent No.: US 11,996,981 B2
(45) Date of Patent: May 28, 2024

(54) OPTIONS TEMPLATE TRANSPORT FOR SOFTWARE DEFINED WIDE AREA NETWORKS

(71) Applicant: Cisco Technology, Inc., San Jose, CA (US)

(72) Inventors: Yuefeng Jiang, Shanghai (CN); Lijian Yang, Liaoning (CN); Jiang Yu, Shanghai (CN)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/973,193

(22) Filed: Oct. 25, 2022

(65) Prior Publication Data
US 2024/0056355 A1 Feb. 15, 2024

Related U.S. Application Data

(60) Provisional application No. 63/397,080, filed on Aug. 11, 2022.

(51) Int. Cl.
*G06F 15/173* (2006.01)
*H04L 41/084* (2022.01)
*H04L 43/08* (2022.01)

(52) U.S. Cl.
CPC ............ *H04L 41/084* (2013.01); *H04L 43/08* (2013.01)

(58) Field of Classification Search
CPC .............................. H04L 41/084; H04L 43/08
See application file for complete search history.

(56) References Cited

U.S. PATENT DOCUMENTS 11,146,468 B1* 10/2021 Chandrasekaran ..... H04L 43/02
2007/0217425 A1 9/2007 Claise et al.
2013/0041934 A1* 2/2013 Annamalaisami ...... H04L 45/38
709/203

(Continued)

FOREIGN PATENT DOCUMENTS

EP 2613497 B1 3/2019

OTHER PUBLICATIONS

Claise, et al "Specification of the IP Flow Information Export (IPFIX) Protocol for the Exchange of Flow Information", Sep. 16, 2013, pp. 1-76.

(Continued)

*Primary Examiner* — Richard G Keehn
(74) *Attorney, Agent, or Firm* — Lee & Hayes P.C.

(57) ABSTRACT

Techniques for improving options templates for network traffic monitoring and analysis, using pull mode by a network collector device, and sending an acknowledgement, by the network collector device that the download was successfully received are described. The techniques may include transmitting, by a network collector device and to a network edge device, a request to download a full options template, receiving, by the network collector device, responses from the network edge device, each response including a segment of the full options template and each segment including a last segment flag indicating whether the segment is a last segment, and in response to receiving a segment having the last segment flag set, transmitting, by the network collector device and to the network edge device, an acknowledgement that the full options template has been received.

20 Claims, 7 Drawing Sheets

(56) References Cited

U.S. PATENT DOCUMENTS

| | | | |
|---|---|---|---|
| 2013/0114612 A1 | 5/2013 | Singh et al. | |
| 2015/0381737 A1* | 12/2015 | Quinn | H04L 67/12 |
| | | | 709/217 |
| 2016/0352761 A1* | 12/2016 | McGrew | H04L 63/1408 |
| 2017/0093681 A1* | 3/2017 | Chaubey | H04L 41/0806 |
| 2021/0083941 A1 | 3/2021 | Mutnuru | |
| 2021/0409275 A1 | 12/2021 | Galchenko et al. | |
| 2022/0224654 A1 | 7/2022 | Munukutla et al. | |

OTHER PUBLICATIONS

PCT Search Report and Written Opinion dated Nov. 24, 2023 for PCT Application No. PCT/US2023/029940, 17 pages.
Quittek, Requirements for IP Flow Information Export (IPFIX), Network Working Group, Oct. 1, 2004, pp. 1-34.
Stewart, et al, "Stream Control Transmission Protocol", Internet Engineering Task Force, Sep. 1, 2007, pp. 1-152.

* cited by examiner (1) FLAGS: N=1, F=0, VERSION=11, TEMPLATE ID=259 (NOTIFICATION, CHANGE OCCURRED)

(2) FLAGS: I=0, A=1, VERSION=11, TEMPLATE ID=259 (RESPONSE, ACK)

(3) FLAGS: I=1, F=0, VERSION=11, TEMPLATE ID=259 (REQUEST, PARTIAL DOWNLOAD)

(4) FLAGS: I=0, M=1, VERSION=11, TEMPLATE ID=259 (RESPONSE, MORE SEGMENTS)

(5) FLAGS: I=0, M=0, VERSION=11, TEMPLATE ID=259 (RESPONSE, LAST SEGMENT)

(6) FLAGS: I=0, A=1, VERSION=11, TEMPLATE ID=259 (RESPONSE, ACK VERSION1)

500 ⟶

```
┌─────────────────────────────────────────────────────────────┐
│                                                             │
│  TRANSMIT, BY A NETWORK COLLECTOR DEVICE AND TO A NETWORK EDGE  │
│     DEVICE, A REQUEST TO DOWNLOAD A FULL OPTION TEMPLATE    │
│                            502                              │
│                                                             │
└─────────────────────────────────────────────────────────────┘
                              │
                              ▼
┌─────────────────────────────────────────────────────────────┐
│                                                             │
│    RECEIVE, BY THE NETWORK COLLECTOR DEVICE, RESPONSES FROM THE │
│  NETWORK EDGE DEVICE, EACH RESPONSE INCLUDING A SEGMENT OF THE FULL │
│    OPTION TEMPLATE AND EACH SEGMENT INCLUDING A LAST SEGMENT FLAG  │
│           INDICATING WHETHER THE SEGMENT IS A LAST SEGMENT         │
│                            504                              │
│                                                             │
└─────────────────────────────────────────────────────────────┘
                              │
                              ▼
┌─────────────────────────────────────────────────────────────┐
│                                                             │
│  IN RESPONSE TO RECEIVING A SEGMENT HAVING THE LAST SEGMENT FLAG SET, │
│   TRANSMIT, BY THE NETWORK COLLECTOR DEVICE AND TO THE NETWORK EDGE  │
│  DEVICE, AN ACKNOWLEDGEMENT THAT THE FULL OPTION TEMPLATE HAS BEEN   │
│                          RECEIVED                            │
│                            506                              │
│                                                             │
└─────────────────────────────────────────────────────────────┘
```

FIG. 5

OPTIONS TEMPLATE TRANSPORT FOR SOFTWARE DEFINED WIDE AREA NETWORKS

RELATED APPLICATIONS

This application claims priority to U.S. Provisional Patent Application No. 63/397,080, filed on Aug. 11, 2022, the entire contents of which are incorporated herein by reference and for all purposes.

TECHNICAL FIELD

The present disclosure relates generally to the field of computer networking, and more particularly to improvements in options templates for network traffic monitoring and analysis, and using pull mode by a collector device and sending an acknowledgement once an updated options template is downloaded.

BACKGROUND

Network flow monitoring, or the collection, analysis, and monitoring of traffic traversing a network, is essential for optimizing network performance and security in the field of computer networking. Data concerning network users and applications, peak usage times, traffic routing, and security may be used to facilitate a deep understanding of network traffic in order to speed problem resolution. For instance, network monitoring systems collect information from various network devices (e.g., routers, switches, etc.) within a network. The information may relate to data flow information occurring at the network devices. The network devices generate packets that include the information and transmit the packets to a collector of the network monitoring system. The collector then verifies the information and can transmit the information to an analysis console within the system for use in performing network monitoring, planning, and security analysis. Accordingly, the use of the information from the network device is vital in ensuring network optimization.

A template-based network flow monitoring solution employs different types of packets, data packets and template packets. Template packets contain template records used to define the format of subsequent data records. A template ID is a unique number that distinguishes the template record from all other template records produced by the same export device. An options template is a special type of template record used to communicate the format of data related to the network flow monitoring process. A data packets contain data records providing information about an IP flow that exists on the device that produced the data packet. Each group of data records references a previously transmitted template ID, which can be used to parse the data contained within the records. An options data record is a special type of data record (based on an options template) with a reserved template ID that provides information about the network flow monitoring process.

Additionally, template-based network flow monitoring solutions conventionally employ a push protocol. That is, each exporter device (e.g., router) periodically sends messages to collector devices without any interaction by the collector. Thus, there is no acknowledgement that the collector successfully received a message sent by the exporter. Typically, messages are sent using UDP as a transport layer protocol, (although SCTP/TCP can also be used) which does not provide error correction and can therefore be unreliable as delivery of packets is not guaranteed as UDP datagrams are transmitted without provision for an acknowledgement.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 5 is a flow diagram of an example method for a full options template download in a new session by a network collector device.

DESCRIPTION OF EXAMPLE EMBODIMENTS

Overview

Figure 1:
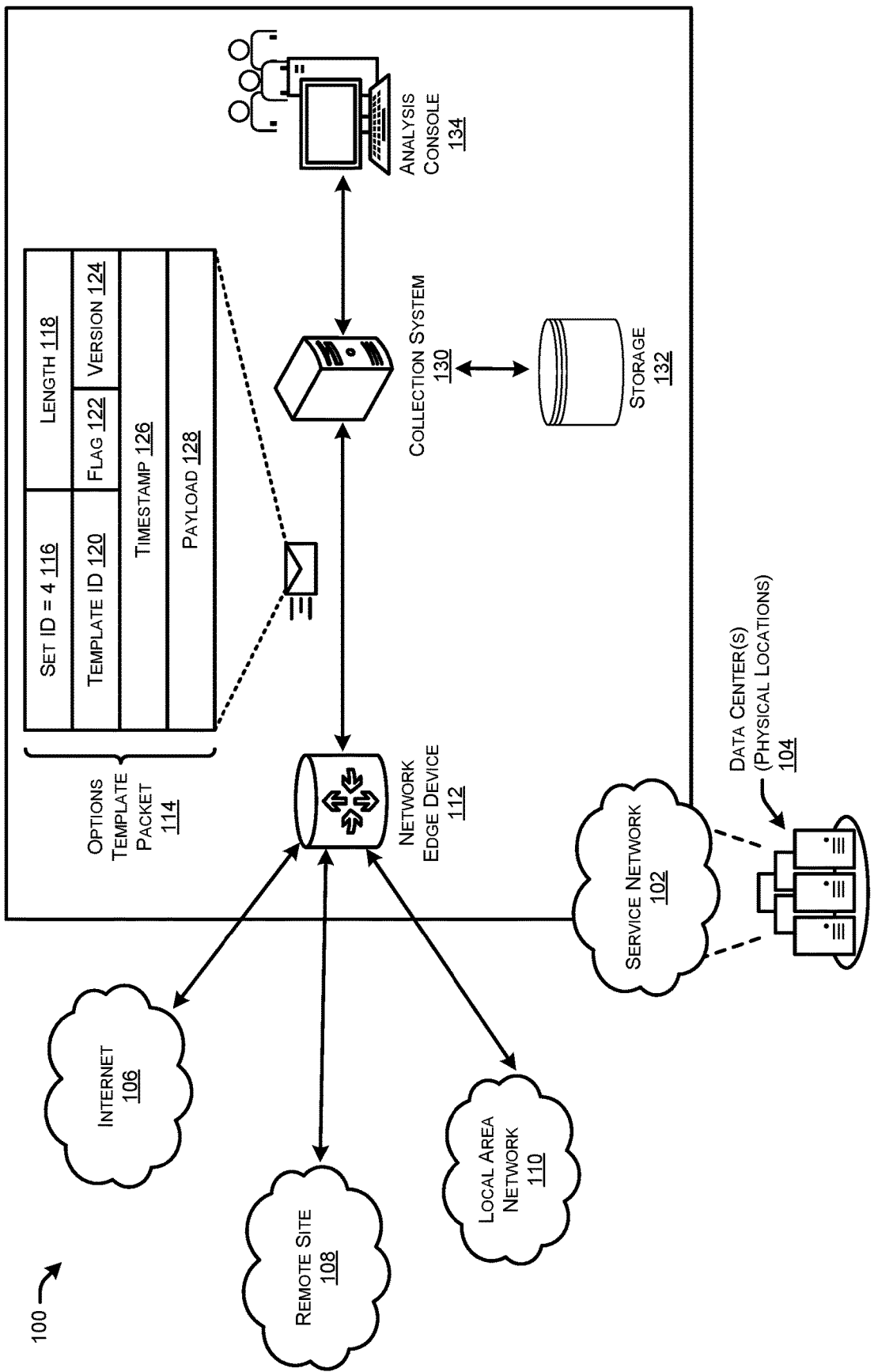
FIG. 1 is an example of a system-architecture diagram of an environment in which a network device generates and sends packets containing information about network flow to a network collector device.

The present disclosure relates generally to improvements in options templates for network traffic monitoring and analysis, and using pull mode by a collector device and sending an acknowledgement once an updated options template is downloaded.

A method to perform techniques described herein may include transmitting, by a network collector device and to a network edge device, a request to download a full options template. Further, the techniques include receiving, by the network collector device, responses from the network edge device, each response including a segment of the full options template and each segment including a flag indicating whether the segment is a last segment. Additionally, the techniques include, in response to receiving a segment having the flag indicating the segment is a last segment, transmitting, by the network collector device and to the network edge device, an acknowledgment that the full options template has been received.

A system to perform techniques described herein may include transmitting, by a network collector device and to a network edge device, a request to download a full options template. Further, the techniques include receiving, by the network collector device, responses from the network edge device, each response including a segment of the full options template and each segment including a flag indicating whether the segment is a last segment. Additionally, the techniques include, in response to receiving a segment having the flag indicating the segment is a last segment, transmitting, by the network collector device and to the network edge device, an acknowledgment that the full options template has been received.

Additionally, the techniques described herein may be performed by a system and/or device having non-transitory computer-readable media storing computer-executable instructions that, when executed by one or more processors, performs the method described above.

Example Embodiments

A computer network can include different nodes (e.g., network devices, client devices, sensors, and any other computing devices) interconnected by communication links and segments for sending data between end nodes. Many types of networks are available, including for example, local area networks (LANs), wide area networks (WANs), software defined wide area networks (SD-WANs), wireless networks, core networks, cloud networks, the Internet, etc. When data traffic is transmitted through one or more networks, the data traffic can traverse several nodes that route the traffic from a source node to a destination node.

As noted above, network data monitoring is crucial in the field of computer networking. In particular, behavioral analysis performed within a service network is driven by analyzing data collected by various network devices (e.g., routers, switches, etc.). For instance, a data center may include a service network with various network devices (e.g., routers, switches, servers etc.). Routers can communicate with other data centers (e.g., other network(s)) and can route traffic through the service network to a particular application within the service network. For instance, a router may receive a packet that is destined for an application within the service network. The router determines a destination IP address associated with a server within the service network and transmits the packet to a switch. The switch may then open a connection with the corresponding server and transmit the packet to an application on the corresponding server. Accordingly, for both incoming and outgoing traffic, network devices may collect data (e.g., metadata, telemetry data, network data, etc.) regarding network flow. In order to collect metadata around the flow of traffic within a service network, the network devices may implement a flow protocol (e.g., NetFlow or IP Flow Information Export (IPFIX)). For instance, the network devices may implement a flow protocol, which enables the network device to collect active IP network traffic as it flows in or out of an interface within the service network. The network devices may then generate packets that include information (e.g., metadata, telemetry data, network data, etc.) about the network flow and transmit the packets to a network collector device (e.g., a network collector device or simply collector) within the service network. The collector then verifies the information and can transmit the information to an analysis console within the system for use in performing behavioral and analysis functions. Accordingly, the use of the information from the network device is vital in ensuring network functionality and security troubleshooting to optimize network performance.

Template-based network flow monitoring solutions (such as NetFlow and IPFIX) employ different types of packets, data packets and template packets. Template packets contain template records used to define the format of subsequent data records. A template ID is a unique number that distinguishes the template record from all other template records produced by the same export device. An options template is a special type of template record used to communicate the format of data related to the network flow monitoring process. A data packet contains data records providing information about an IP flow that exists on the device that produced the data packet. Each group of data records references a previously transmitted template ID, which can be used to parse the data contained within the records. An options data record is a special type of data record (based on an options template) with a reserved template ID that provides information about the network flow monitoring process.

Additionally, template-based network flow monitoring solutions conventionally employ a push protocol. That is, each exporter device (e.g., router) periodically sends messages to collector devices without any interaction by the collector. Thus there is no acknowledgement that the collector successfully received a message sent by the exporter. Typically, messages are sent using UDP as a transport layer protocol, (although SCTP/TCP can also be used) which does not provide error correction and can therefore be unreliable as delivery of packets is not guaranteed as UDP datagrams are transmitted without provision for an acknowledgement.

This disclosure describes improvements in options templates for network traffic monitoring and analysis, and using pull mode by a collector device and sending an acknowledgement once an updated options template is downloaded. Specifically, a new notification and options template format is described that assigns a Set ID=4 (currently, IPFIX Set IDs of 4-255 are unassigned) and a set of flags used to determine whether a message is a response or request, a full or partial update is available, whether a message is a notification message or not, an acknowledgment message or not, and whether there are more segments to be downloaded or whether it is a last segment. Additionally, for increased security, a security protocol (e.g., DTLS) is used for authentication prior to downloading of the new options template.

The new options template with a set ID=4 described herein may be downloaded by a network collector device in a new session once a DTLS session has been established. The network collector device sends a message to a network edge device requesting a full download of the new options template. In response, the network edge device sends responses including segments of the new options template. Each segments includes the flags as mentioned above, including a flag indicating whether each segment is a last segment of the options template or if there are more segments yet to be transmitted. Once the network collector device receives a response having a flag indicating a segment is the last segment, the network collector device sends an acknowledgement response acknowledging that the full download of the new options template has been received.

In addition, when there is a change to the network edge device (e.g., software or hardware configuration change), the network edge device is triggered to transmits a notification message to the network collector device that a change has occurred, and a refresh options template or partial updated options template is available for download. The network collector device response with an acknowledgement message, and in response to a change in the network edge device, the network collector device requests a partial download of the new options template. Similar to the above process for a new session, the network edge device transmits responses including segments of the new partial options template. Each segment including a flag indicating whether the segments is a last segment of the options template or if there are more segments yet to be transmitted. Once the network collector device receives a response having a flag indicating a segment is the last segment, the network collector device sends an acknowledgement response acknowledging that the partial download of the new options template has been successfully received.

Alternately or in addition, the network edge device may periodically send notification messages to the network collector device at predetermined time intervals (e.g., every 600 s) whether there has been a change to the network edge device or not. The network collector device will then compare a local options template version to the remote options template version in the notification message. If the versions are the same, no additional operation is necessary. If the versions are different, there has been a change to the network edge device, and the network collector device proceeds to send a request for a partial options template download as described above.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a SD-WAN system-architecture diagram of an environment 100 in which a network edge device 112 generates and sends packets 114 containing information about network flow to a network collector device 130.

In some examples, the environment 100 may include a service network 102 that includes devices housed or located in one or more data centers 104. The service network 102 may include one or more networks implemented by any viable communication technology, such as wired and/or wireless modalities and/or technologies. The service network 102 may include any combination of Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.) Wide Area Networks (WANs)—both centralized and/or distributed—and/or any combination, permutation, and/or aggregation thereof. The service network 102 may include devices, virtual resources, or other nodes that relay packets from one network segment to another by nodes in the computer network. The service network 102 may include multiple devices that utilize the network layer (and/or session layer, transport layer, etc.) in the OSI model for packet forwarding, and/or other layers.

The one or more data centers 104 may be physical facilities or buildings located across geographic areas that designated to store networked devices that are part of service network 102. The data centers 104 may include various networking devices, as well as redundant or backup components and infrastructure for power supply, data communications connections, environmental controls, and various security devices. In some examples, the data centers 104 may include one or more virtual data centers which are a pool or collection of cloud infrastructure resources specifically designed for enterprise needs, and/or for cloud-based service provider needs. Generally, the data centers 104 (physical and/or virtual) may provide basic resources such as processor (CPU), memory (RAM), storage (disk), and networking (bandwidth). However, in some examples the devices in the packet-forwarding networks 102 may not be located in explicitly defined data centers 104, but may be located in other locations or buildings.

In some instances, the network edge device 112 is included as part of a service network 102. The service network 102 may generally include, manage, or otherwise be associated with one or more applications or services utilized by users accessing the internet 106, a remote site 108, and/or Local Area Network (LAN) 110. The service network 102 may provide any type of application or service for use by users of client devices (not shown). However, in other instances the network edge device 112 may be associated with any type of computing device and be used for any purpose. In some instances, the network device 112 is included as part of the Internet 106, remote site 108, and/or LAN 110, and communicates with network collector device 130 over service network 102. In some examples, network edge device 112 comprises a router, a switch, or any other type of device included in a network architecture.

Network edge device 112 may generate information associated with network flow within the service network 102. As noted above, the network edge device 112 may implement one or more flow protocols (e.g., NetFlow, IPFIX) regarding network flow. For instance, network edge device 112 may implement a flow protocol, such that the network edge device 112 can collect data regarding network flow for incoming packets received from Internet 106, LAN 110, and/or remote site 108 and/or outgoing packets sent to Internet 106, LAN 110, and/or remote site 108. The network edge device 112 may analyze the data and generate, based on the data, the information associated with the network flow.

Network edge device 112 may generate packets to send to a network collector device 130. Packets sent by the network edge device 112 may include template records and data records. A template record is used to define the format of subsequent data records that may be received in current or future export packets. In some examples, a template record may not indicate the format of data records within that same network packet. Accordingly, the network collector device (e.g., network collector device and/or collector application) may cache any template records received, and then parse any data records it encounters by locating the corresponding template record within the cache. For example, the network collector device 130 may cache template records within a collector storage 132 as illustrated in environment 100 of FIG. 1.

In some examples, the network collector device 130 may send the packets with data records to an analysis console 134. The analysis console 134 may comprise an analysis application. In some examples, the analysis console 134 may translate the data records received in the packets into charts, graphs, tables, and other visualizations related to network performance. In some examples, the analysis console 134 may perform behavioral and threat analysis operations (e.g., identifying compromised network devices, identifying network bottlenecks, etc.) using the information contained in data records.

Environment 100 illustrates an example options template packet 114 being sent from the network edge device 112 to the network collector device 130. An options template is a special type of template record used to communicate the format of data related to the network monitoring process. Options are used to supply meta-data about the network monitoring process itself. Options template packet 114 is a newly defined type of options template with a set ID=4 as shown at 116 in FIG. 1. Additionally, the options template packet 114 include a length 118, a template ID 120, multiple flags 122 (the flags available in the Set ID=4 options template are described in detail below with reference to FIG. 2), a version 124, a timestamp 126, and a payload 128. The options template packet 114 is generated by the network edge device 112 and send to the network collector device 130 to be used to define the format of subsequent options data records that may be received in current or future packets sent from the network edge device 112 to the network collector device 130, where the information may be stored in collector storage 132, or used by an analysis application on the analysis console 134 for analyzing network performance.

Figure 2:
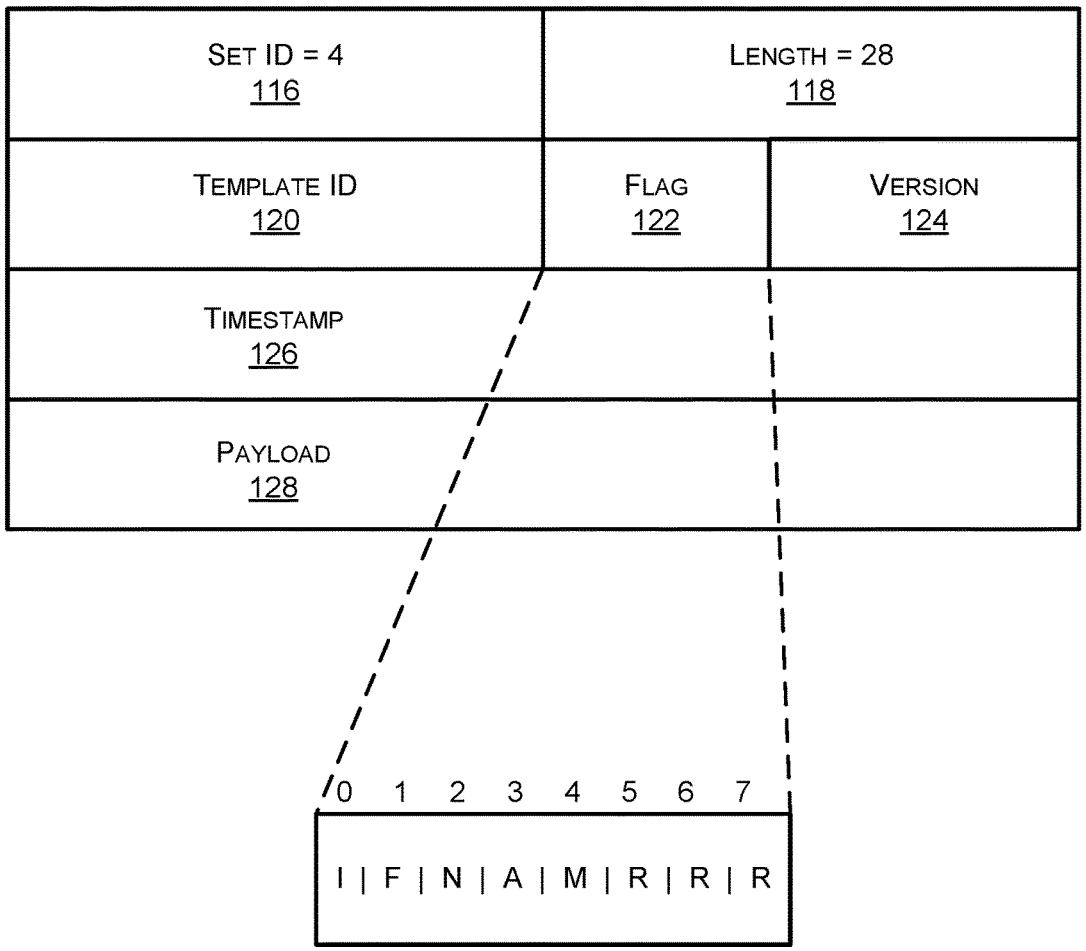
FIG. 2 is an improved options template example including a detailed description of flags available.

FIG. 2 illustrates a detailed example 200 of the options template packet 114 illustrated in FIG. 1, including details of flags available. The flags contain information that is essential for communications between a network edge device and a network collector device for an options template download in a new session and an options template refresh or partial download due to a change in the network edge device. Messaging for an options template download in a new session and an options template refresh or partial options template download, between the network edge device and the network collector device will be described in detail with respect to FIG. 3 and FIG. 4.

The flags available in the options template packet 114 include an I Flag 202, a request or response flag. When the message is a request the I Flag is set to I=1, if the message is a response, I=0. For example, when a collector device requests a full options template download in a new session, the message is a request, thus I=1. In another example, when a network edge device responds to the collector device's request with a segment of the options template, the message is a response, thus I=0.

The flags available also include an F Flag 204, a full or partial options template update. When a full options template download is available and requested by the network collector device, F=1. When a partial download or refresh of the options template is requested by the network collector device, F=0. For example, when a new session is initiated, a full options template download is requested by the network collector device and F=1. When a change in the network edge device occurs, resulting in a partial options template refresh needed, F=0.

Additionally, an N Flag 206 is included in the available flags. The N Flag 206 indicates a notification message. For example, when there has been a change to the network edge device a notification message with N=1, is sent to the network collector device notifying the network collector device that a change has occurred. If a message is not a notification message N=0.

The flags available also include an A Flag 208. The A Flag indicates an acknowledgement message. For example, after the network edge device sends a notification message (N=1) to the network collector device indicating that a change has occurred to the network edge device, the network collector device sends a message including A=1, to the network edge device acknowledging the notification was received. In another example, when the network collector device receives a segment of the new options template download that includes a flag indicating that it is a last segment, the network collector device sends an acknowledgement message with A=1 to the network edge device indicating that the updated options template has been successfully received. If a message is not an acknowledgement message, A=0.

A M Flag 210 is also available and indicates whether there are more segments of the options template still to be receive, or whether the current segment is the last segment to be sent. When M=1, there are more segments to be sent, when M=0, the current segment is the last segment of the download. With regard to the A Flag 208 example above, when the network collector device receives a segment of the new options template in which the M=0, indicating there are no more segments to be transmitted, the segment with M=0 is the last segment, the network collector device responds with an acknowledgement message (A=1) indicating that the new options template was successfully received. Finally, the R Flag 212 is reserved.

Figure 3:
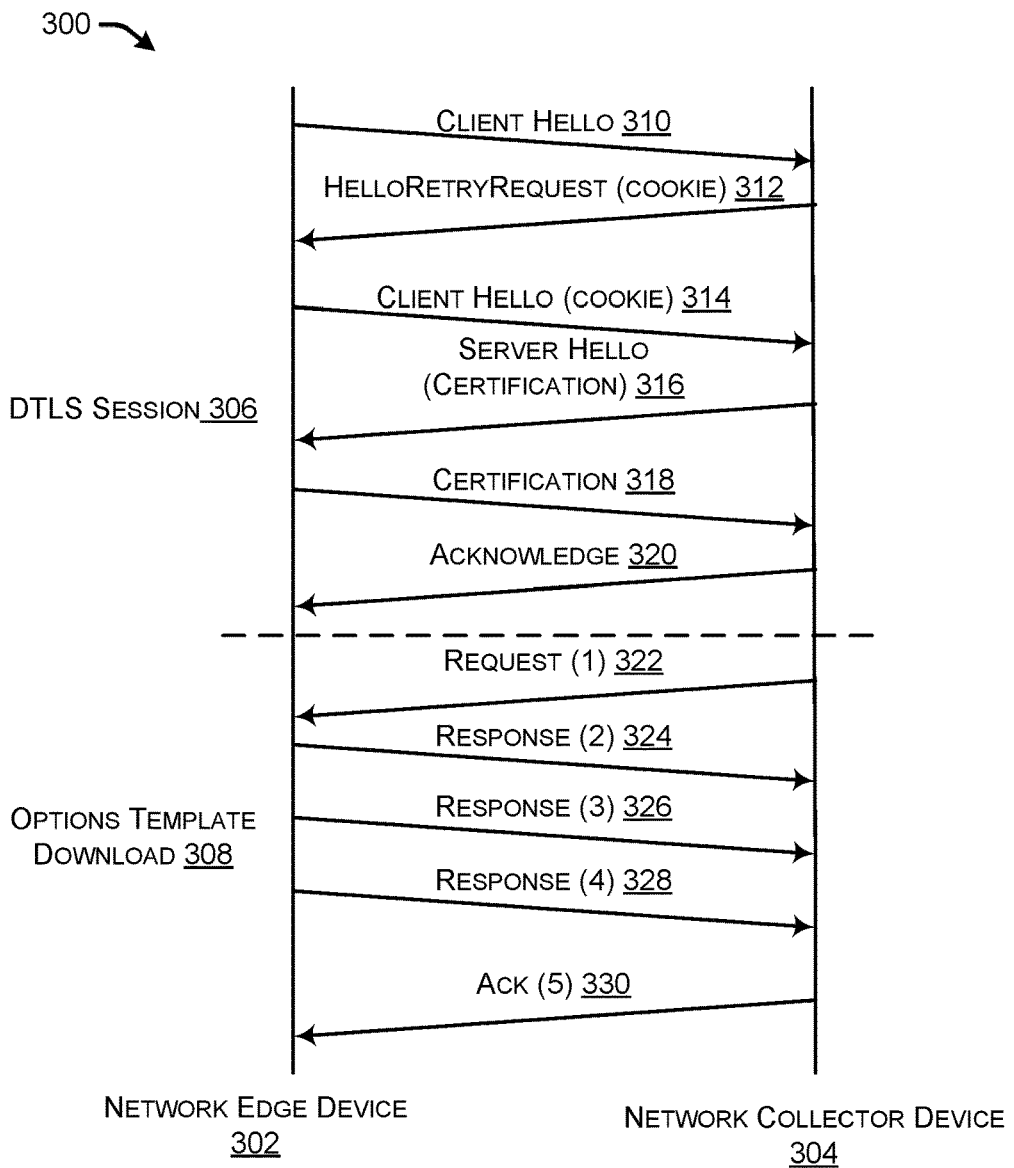
FIG. 3 is an example message flow between a network edge device and a network collector device for a full options template download in a new session.

FIG. 3 illustrates an example message flow 300 between a network edge device 302 and a network collector device 304 for a full options template download in a new session. For security purposes, a DTLS session 306 may be conducted prior to the occurrence of a full options template download 308. To initiate the DTLS session, the network edge device 302 sends a client hello 310 to the network collector device. In response, the network collector device 304 sends a hello retry request with a cookie 312. The network edge device 302 then sends a client hello with a cookie 314. The network collector device 304 responds with a server hello with certification 316. The network edge device 302 responds with certification 318, and finally, the network collector device 304 sends an acknowledgement 320.

Although examples herein are described with reference to DTLS on top of UDP, techniques for implementing a new options template for network traffic monitoring and analysis using pull mode by a collector device and sending acknowledgements once an updated options template is downloaded, are not restricted to DTLS on top of UDP and any other appropriate combination may be used, for example TLS and TCP. In addition, DTLS is not required in order to implement the techniques described here. The use of DTLS on top of UDP is described herein to further enhance security.

Once a DTLS session is established, the network collector device 304 sends a request (1) 322. Request (1) 322 is a request message, requesting a full download of the new options template with a set ID=4, thus the I Flag is set to I=1 indicating a request message and the F Flag is set to F=1 for a full download of the options template. Additionally, version=0 in the request (1) 322 message and template ID=0. In response, the network edge device sends response (2) 324. Response (2) 324 is a response message, thus the I Flag is not set, I=0. Additionally, the M flag, M=1, is set because in this example there are more segments of the new options template set ID=4, to be transmitted. Finally, the version=1 is specified and the template ID is a real template ID assigned by the network edge device 302 to distinguish this template record from other template records sent by the network edge device 302, in this example template ID=259. The network edge device 302 will continue to send segments of the options template set ID=4 and template ID=259, as shown in response (3) 324 and response (4) 328, until a response with the last segment is indicated by the M Flag not being set, M=0, as in response (4) 328 indicating the last segment to be downloaded. Additionally, each response containing a segment of the options template indicates the real template ID, in this example template ID=259. In response to receiving a segment in which the M Flag indicates the last segment (M=0), the network collector device 304 sends an acknowledgement, in which the A Flag is set, A=1, to indicate acknowledgement that the options template set ID=4 with template ID=259, version=1 has been successfully received.

Figure 4:
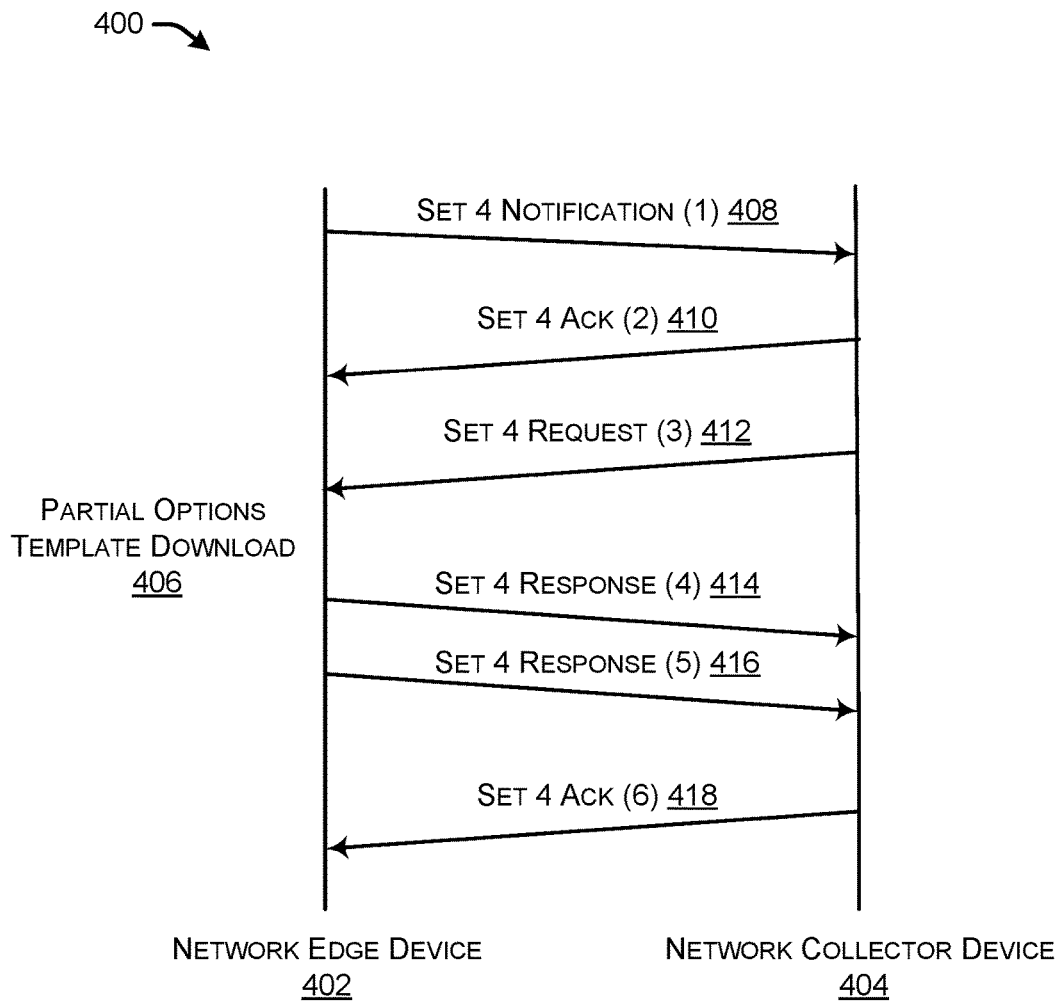
FIG. 4 is an example message flow between a network edge device and a network collector device for a partial options template download due to a network edge device change or a threshold time limit.

FIG. 4 illustrates message flow 400 between a network edge device 402 and a network collector device 404 for a partial options template download 406 or options template refresh due to a change in the network edge device. A notification (1) 408 message may be sent from the network edge device 402 to the network collector device 404 on a periodic basis (e.g., every 600 s, or some other user defined time period) with information regarding the version number (e.g., version 124 as illustrated in FIG. 2). A change in the network edge device 402 (e.g., a software or hardware configuration change) will also trigger the notification (1) 408 to be sent to the network collector device 404. For example, network edge device 402 may send a notification (1) 408 indicating the version has changed to version=11 as indicated in FIG. 4. When the network collector device 404 receives the notification (1) 408 from the network edge device, the network collector device will respond with an ack (2) 410 message acknowledging that receipt of the notification (1) 408 message. Additionally, the network collector device 404 will compare the version number received in the notification (1) 408 message (e.g., version=11) to a local version number of the current set ID=4 options template record that is stored in storage 132 as illustrated in FIG. 1. If the versions are the same, no additional operation is initiated. If the local and remote version numbers are not the same, a network edge device change has occurred, and the network collector device 404 will request a partial options template download or refresh to acquire the new options template information. For instance, if the local version is version=1, and the notification (1) 408 message contains version=11, there has been a change to the network edge device and a partial options template update is available. The network collector device 404 sends a request (3) 412 message to the network edge device to pull the new information available. When the network edge device 402 receives the pull request (3) 412 from the network collector device, the network edge device 412 determines the difference between the version of the options template that the network collector device 404 currently has, and the new available version, in this example, the difference between version=1 and version=11. Once the difference is determined, the network edge device 402 will send responses including segments of the new set ID=4 options template, such as response (4) 414 and response (5) 416 as illustrated in FIG. 4, that contain the updated information in version==11. Each response sent by the network edge device 402 including segments of the new set ID=4 options template, includes the M Flag which indicates whether there are more segments yet to be transmitted, or if the current response is the last segment needed for the partial download of the new set ID=4 options template. When the network collector device 404 receives a response (e.g., response (5) 416) in which M=0, indicating there are no more segments to download, the network collector device 404 responds to the network edge device 402 with ack (6) 418, acknowledging that all the segments of the new options template, having the real template ID (e.g., template ID=259 in the example illustrated in FIG. 4) and the version number (e.g., version=11) have been received.

FIG. 5 illustrates a flow diagram of an example method 500 for a full options template download in a new session by a network collector device. In some instances, the steps of method 500 may be performed by a network collector device (e.g., network collector device of network collector device 130 of FIG. 1 or network collector device 304 of FIG. 3) that includes one or more processors and one or more non-transitory computer-readable media storing computer-executable instructions that, when executed by the one or more processors, cause the one or more processors to perform operations of method 500.

At operation 502, the network collector device may transmit a request to download a full options template to a network edge device. For example, as shown in FIG. 3, the network collector device 304 transmits request (1) 322 to the network edge device 302 requesting a full options template download once a DTLS session has been established.

At operation 504, the network collector device receives responses from the network edge device, each response including a segment of the full options template and each segment including a last segment flag indicating whether the segment is a last segment. For instance, the network edge device 302 transmits response (2) 324, response (3) 326, and response (4) 328 to the network collector device 304. Each of the three responses contain a segment of the new options template (with set ID=4), and each segment includes the M Flag indicating whether the segment is a last segment (M=0), or if there are more segments to come (M=1).

At operation 506, in response to receiving a segment having the last segment flag indicating the segments is a last segment, the network collector device transmits an acknowledgment that the full options template has been received to the network edge device. For example, in response to the network collector device 304 receiving response (4) 318 indicating the segment is the last segment (M=0), the network collector device 304, transmits the acknowledgement message, Ack (5) 330, to the network edge device 302 acknowledging (A=1) that the full options template download has been successfully received.

Figure 6:
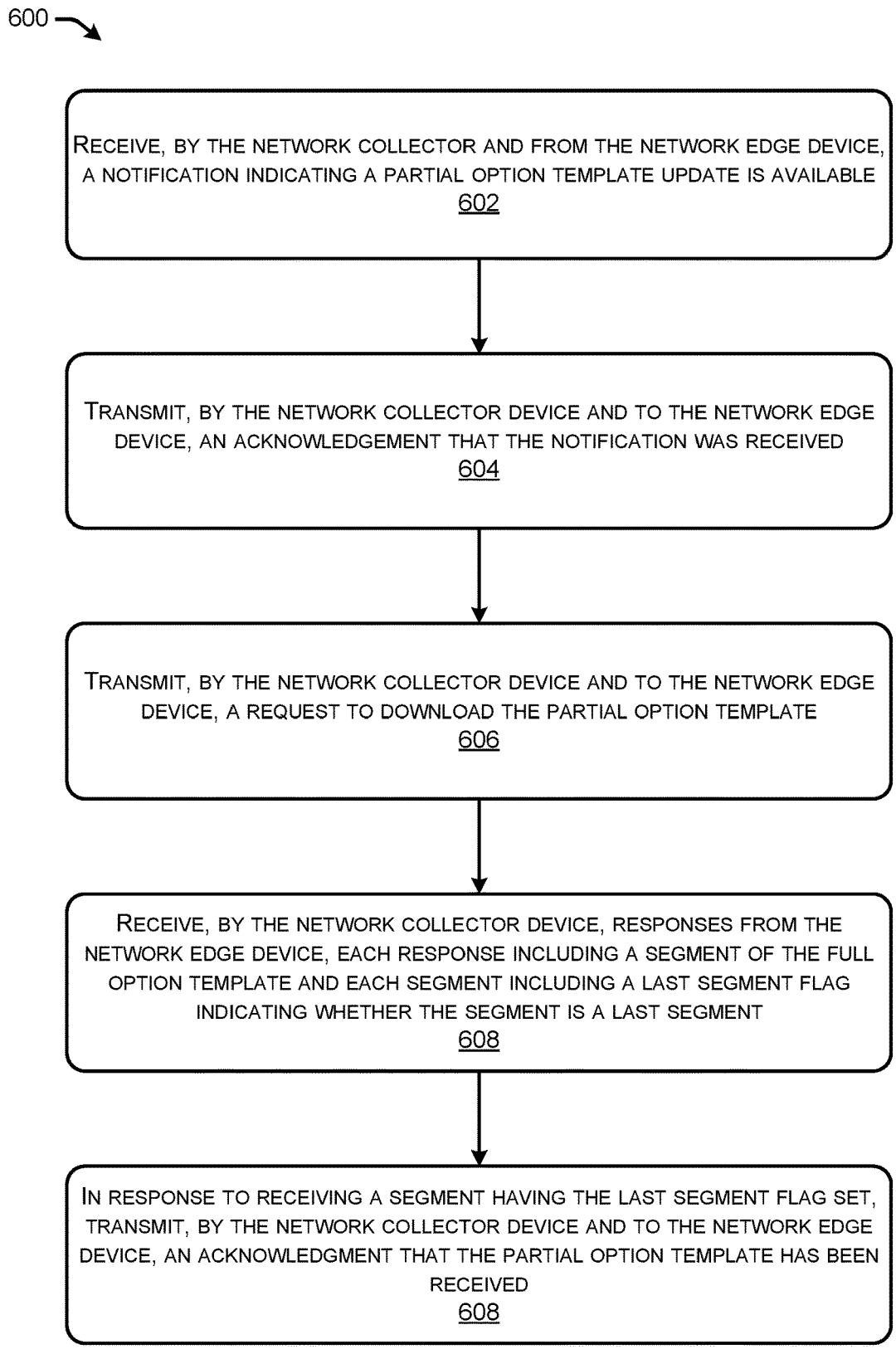
FIG. 6 is a flow diagram of an example method for a partial options template download by a network collector device due to a network edge device change or a threshold time limit.

FIG. 6 illustrates a flow diagram 600 for a partial options template download by a network collector device due to a network edge device change or a threshold time limit. In some instances, the operations of flow diagram 600 may be performed by a network collector device (e.g., network collector device 130 of FIG. 1 or network collector device 404 or FIG. 4) that includes one or more processors and one or more non-transitory computer-readable media storing computer-executable instructions that, when executed by the one or more processors, cause the one or more processors to perform operations of flow diagram 600.

At operation 602, the network collector device receives a notification indicating a partial options template update is available for download from the network edge device. For example, the network edge device 402 send the network collector device 404 the notification (1) 408 indicating that an edge change has occurred and a partial options template is available for download. Alternately or in addition, if no change has occurred at the edge for more than a predetermined time interval, the network edge device 402 may send out periodic messages to the network collector device 404.

At operation 604, the network collector device transmits an acknowledgment that the notification was received to the network collector device. For instance, network collector device 404 sends ack (2) 410, acknowledging (A=1) that notification (1) 408 was received, to the network edge device 402.

At operation 606, the network collector device transmits a request to download the partial options template to the network edge device. For example, the network collector device will compare the local version (e.g., local version stored in collector storage 132 of FIG. 1) with the remote version received from the network edge device, if there is a mismatch, indicating a change has occurred, the network collector device 404 sends request (3) 412 to the network edge device 402 requesting the partial options template (set ID=4) download. Alternately, if no change in the network edge device 402 has occurred no additional operation occurs.

At operation 608, the network collector device receives responses from the network edge device, each response including a segment of the partial options template and each segment including a last segment flag indicating whether the segment is a last segment. For instance, network edge device 402 will determine the difference between the version of the options template that the network collector device 404 currently has, and the new version. The network edge device 402 then sends response (4) 414 and response (5) 416 to network collector device 404. Each response includes a segment of the partial options template (set ID=4) download containing the changes to the options template.

At operation 610, in response to receiving a segment having the flag indicating the segment is a last segment, the network collector device, transmits an acknowledgement that the partial options template has been received, to the network edge device. For example, network collector device 404 sends ack (6) 418 to the network edge device 402 indicating acknowledgement (A=1) that a response having the last segment flag indicating the segment is a last segment (M=0), in this example response (5) 416 where M=0, has been received.

Figure 7:
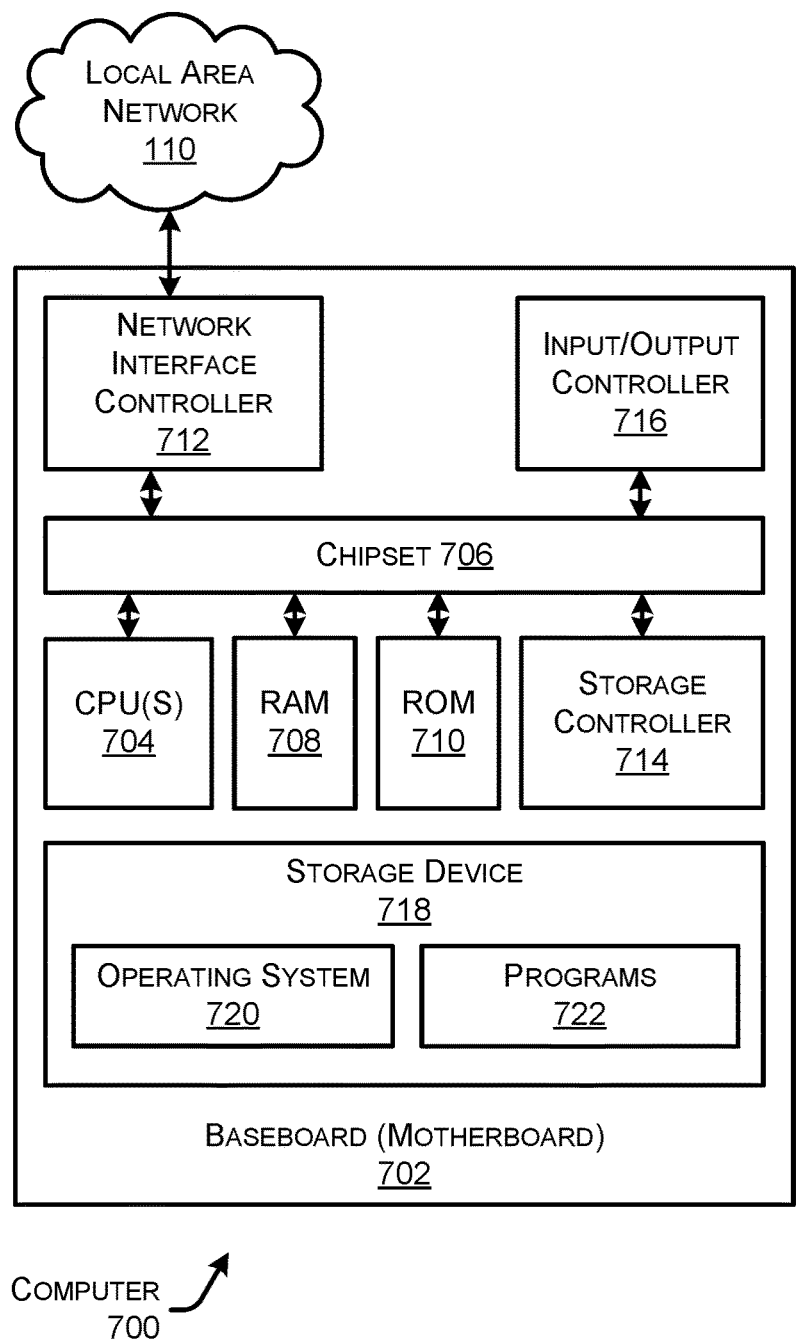
FIG. 7 is a computer architecture diagram showing an illustrative computer hardware architecture for implementing a server device that can be utilized to implement aspects of the various technologies presented herein.

FIG. 7 shows an example computer architecture for a device capable of executing program components for implementing the functionality described above. The computer architecture shown in FIG. 7 illustrates any type of computer 700, such as a conventional server computer, workstation, desktop computer, laptop, tablet, network appliance, e-reader, smartphone, or other computing device, and can be utilized to execute any of the software components presented herein. The computer may, in some examples, correspond to a network edge device 112, a network collector device 130, and/or any other device described herein, and may comprise personal devices (e.g., smartphones, tables, wearable devices, laptop devices, etc.) networked devices such as servers, switches, routers, hubs, bridges, gateways, modems, repeaters, access points, and/or any other type of computing device that may be running any type of software and/or virtualization technology.

The computer 700 includes a baseboard 702, or "motherboard," which is a printed circuit board to which a multitude of components or devices can be connected by way of a system bus or other electrical communication paths. In one illustrative configuration, one or more central processing units ("CPUs") 704 operate in conjunction with a chipset 706. The CPUs 704 can be standard programmable processors that perform arithmetic and logical operations necessary for the operation of the computer 700.

The CPUs 704 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 706 provides an interface between the CPUs 704 and the remainder of the components and devices on the baseboard 702. The chipset 706 can provide an interface to a RAM 708, used as the main memory in the computer 700. The chipset 706 can further provide an interface to a computer-readable storage medium such as a read-only memory ("ROM") 710 or non-volatile RAM ("NVRAM") for storing basic routines that help to startup the computer 700 and to transfer information between the various components and devices. The ROM 710 or NVRAM can also store other software components necessary for the operation of the computer 700 in accordance with the configurations described herein.

The computer 700 can operate in a networked environment using logical connections to remote computing devices and computer systems through a network, such as the LAN 110, Internet 106, Remote Site(s) 108, etc. The chipset 706 can include functionality for providing network connectivity through a NIC 712, such as a gigabit Ethernet adapter. The NIC 712 is capable of connecting the computer 700 to other computing devices over the LAN 110. It should be appreciated that multiple NICs 712 can be present in the computer 700, connecting the computer to other types of networks and remote computer systems.

The computer 700 can be connected to a storage device 718 that provides non-volatile storage for the computer. The storage device 718 can store an operating system 720, programs 722, and data, which have been described in greater detail herein. The storage device 718 can be connected to the computer 700 through a storage controller 714 connected to the chipset 706. The storage device 718 can consist of one or more physical storage units. The storage controller 714 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 700 can store data on the storage device 718 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 718 is characterized as primary or secondary storage, and the like.

For example, the computer 700 can store information to the storage device 718 by issuing instructions through the storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 700 can further read information from the storage device 718 by detecting the physical states or characteristics of one or more particular locations within the physical storage units.

In addition to the mass storage device 718 described above, the computer 700 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 700. In some examples, the operations performed by the network edge device 112, the network collector device 130, and/or any components included therein, may be supported by one or more devices similar to computer 700. Stated otherwise, some or all of the operations performed by network edge device 112 and/or network collector device 130, and or any components included therein, may be performed by one or more computer devices 700.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 718 can store an operating system 720 utilized to control the operation of the computer 700. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 718 can store other system or application programs and data utilized by the computer 700.

In one embodiment, the storage device 718 or other computer-readable storage media is encoded with computer-executable instructions which, when loaded into the computer 700, transform the computer from a general-purpose computing system into a special-purpose computer capable of implementing the embodiments described herein. These computer-executable instructions transform the computer 700 by specifying how the CPUs 704 transition between states, as described above. According to one embodiment, the computer 700 has access to computer-readable storage media storing computer-executable instructions which, when executed by the computer 700, perform the various processes described above with regard to FIGS. 1-6. The computer 700 can also include computer-readable storage media having instructions stored thereupon for performing any of the other computer-implemented operations described herein.

The computer 700 can also include one or more input/output controllers 716 for receiving and processing input from a number of input devices, such as a keyboard, a mouse, a touchpad, a touch screen, an electronic stylus, or other type of input device. Similarly, an input/output controller 716 can provide output to a display, such as a computer monitor, a flat-panel display, a digital projector, a printer, or other type of output device. It will be appreciated that the computer 700 might not include all of the components shown in FIG. 7, can include other components that are not explicitly shown in FIG. 7, or might utilize an architecture completely different than that shown in FIG. 7.

As described herein, the computer 700 may comprise one or more of a network edge device 112, a network collector device 130, and/or any other device. The computer 700 may include one or more hardware processors 704 (processors) configured to execute one or more stored instructions. The processor(s) 704 may comprise one or more cores. Further, the computer 700 may include one or more network interfaces configured to provide communications between the computer 700 and other devices, such as the communications described herein as being performed by the network edge device 112, the network collector device 130, and/or any other device. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 722 may comprise any type of programs or processes to perform the techniques described in this disclosure for the monitoring and analysis of network traffic using a new options template, and using pull mode by a collector device and sending an acknowledgement once an updated options template is downloaded.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
transmitting, by a network collector device and to a network edge device, a request to download an options template, the request including a first flag indicating whether the requested download is for a full options template or a partial options template;
based at least in part of the first flag indicating the requested download is for the full options template, receiving, by the network collector device, responses from the network edge device, each response including a segment of the full options template and each segment including a second flag indicating whether the segment is a last segment or at least one more segment will follow; and
in response to receiving a segment having the second flag indicating the segment is a last segment, transmitting, by the network collector device and to the network edge device, an acknowledgement that the full options template has been received.

2. The method of claim 1, further comprising:
acknowledging, by the network collector device, that a Datagram Transport Layer Security (DTLS) session has been established with the network edge device prior to transmitting a request to download the full options template.

3. The method of claim 1, wherein the request to download a full options template includes a template ID of 0, a version of 0, and a set ID of 4.

4. The method of claim 1, wherein the acknowledgment that the full options template has been received includes a set ID of 4, a version of 1, and a flag indicating an acknowledgement message.

5. The method of claim 1, further comprising:
receiving, by the network collector device and from the network edge device, a notification indicating a partial options template update is available;
transmitting, by the network collector device and to the network edge device, an acknowledgement that the notification was received;
transmitting, by the network collector device and to the network edge device, a request to download the partial options template;
receiving, by the network collector device, responses from the network edge device, each response including a segment of the partial options template and each segment including a flag indicating whether the segment is a last segment; and
in response to receiving a segment having the flag indicating the segment is a last segment, transmitting, by the network collector device and to the network edge device, an acknowledgement that the partial options template has been received.

6. The method of claim 5, wherein the notification is triggered at predetermined time intervals, or when there is a change to the network edge device.

7. The method of claim 6, further comprising:
comparing, by the network collector device, a local version number and a remote version number received in the notification;
determining that the remote version number received in the notification is different than a local version number;
based at least in part on the remote version number being different than the local version number, determining that a change to the network edge device has occurred; and
transmitting the request to download the partial options template.

8. A system comprising:
one or more processors; and
one or more non-transitory computer-readable media storing computer-executable instructions that, when executed by the one or more processors, cause the one or more processors to perform operations comprising:
transmitting, by a network collector device and to a network edge device, a request to download an options template, the request including a first flag indicating whether the requested download is for a full options template or a partial options template;
based at least in part of the first flag indicating the requested download is for the full options template, receiving, by the network collector device, responses from the network edge device, each response including a segment of the full options template and each segment including a second flag indicating whether the segment is a last segment or at least one more segment will follow; and
in response to receiving a segment having the second flag indicating the segment is a last segment, transmitting, by the network collector device and to the network edge device, an acknowledgement that the full options template has been received.

9. The system of claim 8, the operations further comprising:
acknowledging, by the network collector device, that a Datagram Transport Layer Security (DTLS) session has been established with the network edge device prior to transmitting a request to download the full options template.

10. The system of claim 8, wherein the request to download a full options template includes a template ID of 0, a version of 0, and a set ID of 4.

11. The system of claim 8, wherein the acknowledgment that the full options template has been received includes a set ID of 4, a version of 1, and a flag indicating an acknowledgement message.

12. The system of claim 8, the operations further comprising:
receiving, by the network collector device and from the network edge device, a notification indicating a partial options template update is available;
transmitting, by the network collector device and to the network edge device, an acknowledgement that the notification was received;
transmitting, by the network collector device and to the network edge device, a request to download the partial options template;
receiving, by the network collector device, responses from the network edge device, each response including a segment of the partial options template and each segment including a flag indicating whether the segment is a last segment; and
in response to receiving a segment having the flag indicating the segment is a last segment, transmitting, by the network collector device and to the network edge device, an acknowledgement that the partial options template has been received.

13. The system of claim 12, wherein the notification is triggered at predetermined time intervals, or when there is a change to the network edge device.

14. The system of claim 13, the operations further comprising:
comparing, by the network collector device, a local version number and a remote version number received in the notification;
determining that the remote version number received in the notification is different than a local version number;
based at least in part on the remote version number being different than the local version number, determining that a change to the network edge device has occurred; and
transmitting the request to download the partial options template.

15. One or more non-transitory computer-readable media storing instructions that, when executed, cause one or more processors to perform operations comprising:
transmitting, by a network collector device and to a network edge device, a request to download an options template, the request including a first flag indicating whether the requested download is for a full options template or a partial options template;
based at least in part of the first flag indicating the requested download is for the full options template, receiving, by the network collector device, responses from the network edge device, each response including a segment of the full options template and each segment including a second flag indicating whether the segment is a last segment or at least one more segment will follow; and
in response to receiving a segment having the second flag indicating the segment is a last segment, transmitting, by the network collector device and to the network edge device, an acknowledgement that the full options template has been received.

16. The one or more non-transitory computer-readable media of claim 15, the operations further comprising:

acknowledging, by the network collector device, that a Datagram Transport Layer Security (DTLS) session has been established with the network edge device prior to transmitting a request to download the full options template.

17. The one or more non-transitory computer-readable media of claim 15, wherein the request to download a full options template includes a template ID of 0, a version of 0, and a set ID of 4.

18. The one or more non-transitory computer-readable media of claim 15, wherein the acknowledgment that the full options template has been received includes a set ID of 4, a version of 1, and a flag indicating an acknowledgement message.

19. The one or more non-transitory computer-readable media of claim 15, the operations further comprising:
receiving, by the network collector device and from the network edge device, a notification indicating a partial options template update is available;
transmitting, by the network collector device and to the network edge device, an acknowledgement that the notification was received;
transmitting, by the network collector device and to the network edge device, a request to download the partial options template;
receiving, by the network collector device, responses from the network edge device, each response including a segment of the partial options template and each segment including a flag indicating whether the segment is a last segment; and
in response to receiving a segment having the flag indicating the segment is a last segment, transmitting, by the network collector device and to the network edge device, an acknowledgement that the partial options template has been received.

20. The one or more non-transitory computer-readable media of claim 19, the operations further comprising:
comparing, by the network collector device, a local version number and a remote version number received in the notification;
determining that the remote version number received in the notification is different than a local version number;
based at least in part on the remote version number being different than the local version number, determining that a change to the network edge device has occurred; and
transmitting the request to download the partial options template.

* * * * *